(12) United States Patent
Hung et al.

(10) Patent No.: US 7,788,548 B2
(45) Date of Patent: Aug. 31, 2010

(54) METHOD FOR PERFORMING A DEFECTIVE-AREA MANAGEMENT IN AN OPTICAL MEDIA

(75) Inventors: Ying-che Hung, San-Chung (TW); Ching-wen Hsueh, Yilan County (TW)

(73) Assignee: MEDIATEK Inc., Hsin-Chu (TW)

( * ) Notice: Subject to any disclaimer, the term of this patent is extended or adjusted under 35 U.S.C. 154(b) by 433 days.

(21) Appl. No.: 11/612,075

(22) Filed: Dec. 18, 2006

(65) Prior Publication Data

US 2007/0220373 A1    Sep. 20, 2007

Related U.S. Application Data

(60) Provisional application No. 60/773,552, filed on Feb. 15, 2006.

(51) Int. Cl.
*G11C 29/00* (2006.01)
*G11B 27/36* (2006.01)
*G06F 9/26* (2006.01)

(52) U.S. Cl. .................. 714/710; 714/723; 360/31; 711/202

(58) Field of Classification Search .............. None
See application file for complete search history.

(56) References Cited

U.S. PATENT DOCUMENTS

| 6,189,118 | B1 | 2/2001 | Sasaki et al. |
| 6,778,480 | B2 | 8/2004 | Nadershashi et al. |
| 6,922,802 | B2 * | 7/2005 | Kim et al. .............. 714/723 |
| 6,993,679 | B2 * | 1/2006 | George .................. 714/8 |
| 2004/0071056 | A1 * | 4/2004 | Park et al. ............. 369/47.14 |
| 2006/0245344 | A1 * | 11/2006 | Song .................... 369/275.4 |

* cited by examiner

*Primary Examiner*—Christine T Tu

(57) ABSTRACT

The present invention discloses a method for performing a defective-area management adaptive to a slipping replacement algorithm in an optical media with segmented sector/blocks, by either keeping buffering a read user data of the sector/block to a buffer memory, regardless of the read sector/block is defective, or keeping buffering the read user data to two different memories based on whether the sector/block is defective, thereby simplifying the complicated steps due to absence of interruption of data buffering, and therefore raising an operating performance.

24 Claims, 8 Drawing Sheets

| Physical sector number | Logical sector number | Physical sector status |
|---|---|---|
| N | M | Good |
| N+1 | - | Defective |
| N+2 | M+1 | Good |
| N+3 | M+2 | Good |
| N+4 | M+3 | Good |
| N+5 | - | Defective |
| N+6 | M+4 | Good |
| N+7 | M+5 | Good |
| N+8 | - | Defective |
| N+9 | - | Defective |
| N+10 | M+6 | Good |

METHOD FOR PERFORMING A DEFECTIVE-AREA MANAGEMENT IN AN OPTICAL MEDIA

CROSS-REFERENCE TO RELATED APPLICATION

The present application claims the benefit of the filing date under 35 U.S.C. §119(e) of a Provisional U.S. Patent Application No. 60/773,552, filed on Feb. 15, 2006, which is incorporated by reference herein.

The present invention relates to a method for performing a defective-area management in an optical media, and especially to a method for performing a defective-area management adaptive to a slipping replacement algorithm.

On a typical optical media, like a DVD-ROM, DVD-RAM, DVD-RW+RW/−RW or HDDVD, any one defective sector/block derived from a disc fabrication process or an initial format could be pre-detected before any data recording. Because the data, such as a physical sector number (PSN) or identifier, referring to a relative physical location of the defective sector/block has been pre-registered in a primary defect list (PDL) located on the optical media. By checking the PDL to recognize all the defective sectors/blocks on the optical media, those defective sectors/blocks can be prevented from being used as data recording.

During a reading process of the typical optical media, a defective-area management mechanism of a playing/recording apparatus (e.g. a DVD player) would be activated to recognize which one physical sector/block is defective according to the PDL, and to determine which one logical sector is assigned to a corresponding indefective physical sector/block on the optical media with a logical sector number (LSN) wherein an indefective physical sector/block can be a recordable region where is well for data recording. Any recognized defective sector/block would not be assigned with a logical sector number (LSN) thereby avoiding recording the data thereon. If there are successively neighboring indefective physical sectors/blocks, the sequential logical sector numbers will be assigned thereto for keeping data recording.

Figure 1A:
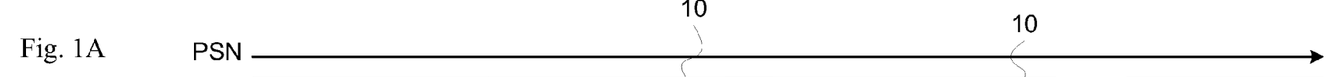
FIGS. 1A, 1B and 1C illustrate a schematic diagram of an relationship among a physical sector number (PSN), various area without defective sector/block and a logical sector number (LSN) in a conventional DVD-RAM type disk under a slipping replacement algorithm.
Figure 1B:
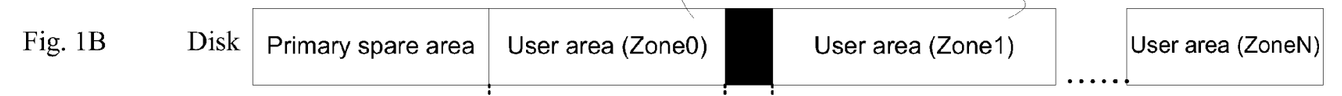
Figure 1C:
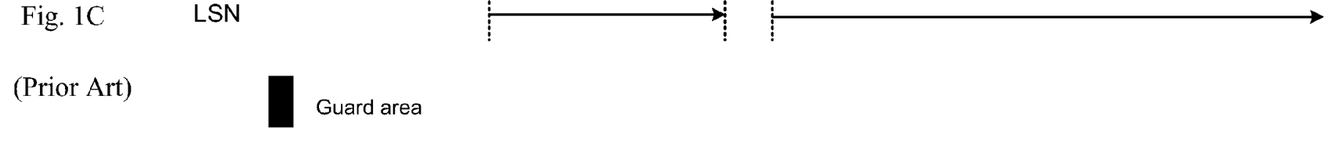

To implement the defective-area management, a slipping replacement algorithm and a liner replacement algorithm are frequently adapted in the present. For a slipping replacement algorithm, in an exemplar of a conventional DVD-RAM type disk, there are a lead-in area, a data area and lead-out area sequentially allocated from an inner radius to an outer radius of the disk. The lead-in area stores the PDL thereon. Typically, as shown in FIG. 1B, the data area is divided into a plurality of the user area 10 (e.g. from zone 0 to zone N) on which the data to be recorded and a primary spare area (PSA) located at the top of the zone 0 where is the innermost position than the zone 0 and next to it for providing sequential indefective sectors to compensate any defective sectors occurring in the user area 10. As shown in FIG. 1B, user area 10 (i.e. Zone 0 and Zone 1) are segmented by a guard area. FIG. 1A illustrates an arrangement of sequential physical sector numbers (PSN) corresponding all of the physical sectors in data area, regardless of whether is defective or not. FIG. 1C illustrates an arrangement of sequential logical sector numbers (LSN) which are respectively assigned to the indefective physical sectors in segmented user area 10. Please be kindly noted that the guard area would not be assigned in LSN and the data cannot be written in it. As shown in FIG. 1B, all of the physical sectors allocated on the user area 10 (i.e. Zone 0 and Zone 1) are indefective well for data recording.

Figure 2A:
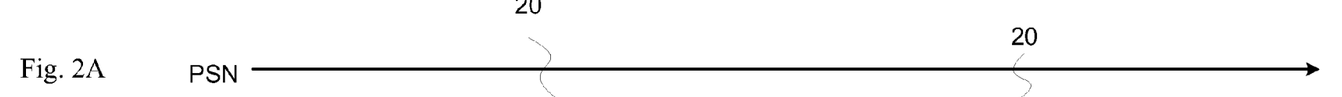
FIGS. 2A, 2B and 2C illustrate a schematic diagram of an relationship among a physical sector number (PSN), various area with defective sector/block and a logical sector number (LSN) in another conventional DVD-RAM type disk under the slipping replacement algorithm.
Figure 2B:
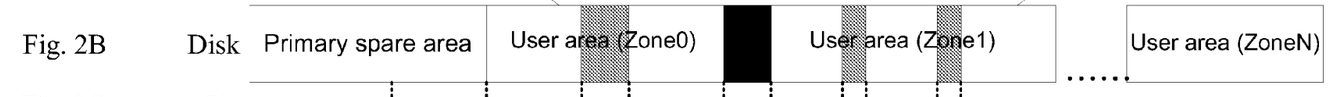
Figure 2C:
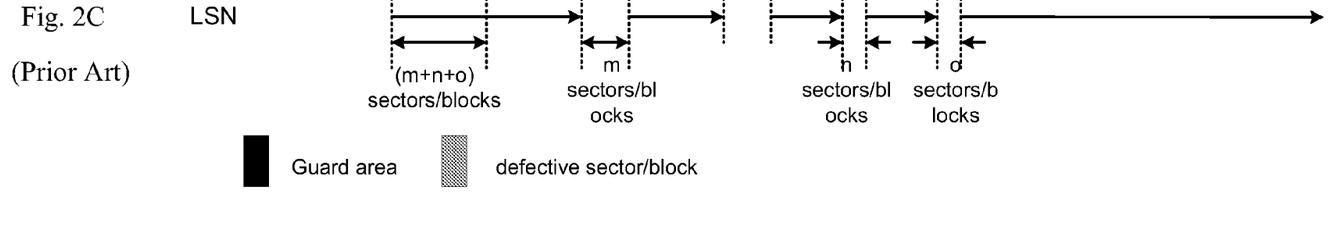

Further referring to FIGS. 2A, 2B and 2C, during a data recording process of a playing/recording apparatus on another DVD-RAM type disk, the numbers "m" (m>1 or m=1) of defective sectors in a user area 20 (i.e. zone 0) are being recognized as registered in the PDL of the disk by the defective-area management mechanism with slipping replacement algorithm. Since all of the data that needs to be recorded but the zone 0 can not supply enough indefective sectors/blocks, the "m" defective sectors shall be replaced by the same numbers "m" of the indefective physical sectors without use yet, which is foremost allocated within the primary spare area (PSA), before the defective sectors are to use. This causes a slip of recordable sectors towards the primary spare area (PSA) as the top of the zone 0 where the "m" defective sectors are located. It means that the next sequential logical sector numbers (LSN) are assigned in turns to the "m" indefective physical sectors of the primary spare area (PSA), for compensating the "m" defective physical sectors in the zone 0. Continuing to the next data recording process of the playing/recording apparatus, as shown in FIG. 2B, if there are next segmented defective sectors with the numbers "n" and "o" recognized in another user area 20 (i.e. zone 1) this further causes the sectors relative to the previous zone 0 to be slipped towards the top of the data area so that there are numbers "m+n+o" of the sequential physical sectors accumulated in the primary spare area.

During the data recording process, besides that a part of the data are respectively written in the indefective physical sectors on those data area 20, the rest parts of the data will be turned to be written in the indefective physical sectors of the primary spare area upon the corresponding defective physical sectors "m", "n" and "o", according to sequence of the logical sector numbers allocated.

In the case of DVD-RAM, each minimum unit used to be slipped is a physical sector. In another case of HDDVD RAM, each minimum unit used to be slipped can be an Error Correction Code (ECC) block which is constructed of successive grouped logical sectors of user data, including, for example, 32 logical sectors.

Figure 11:
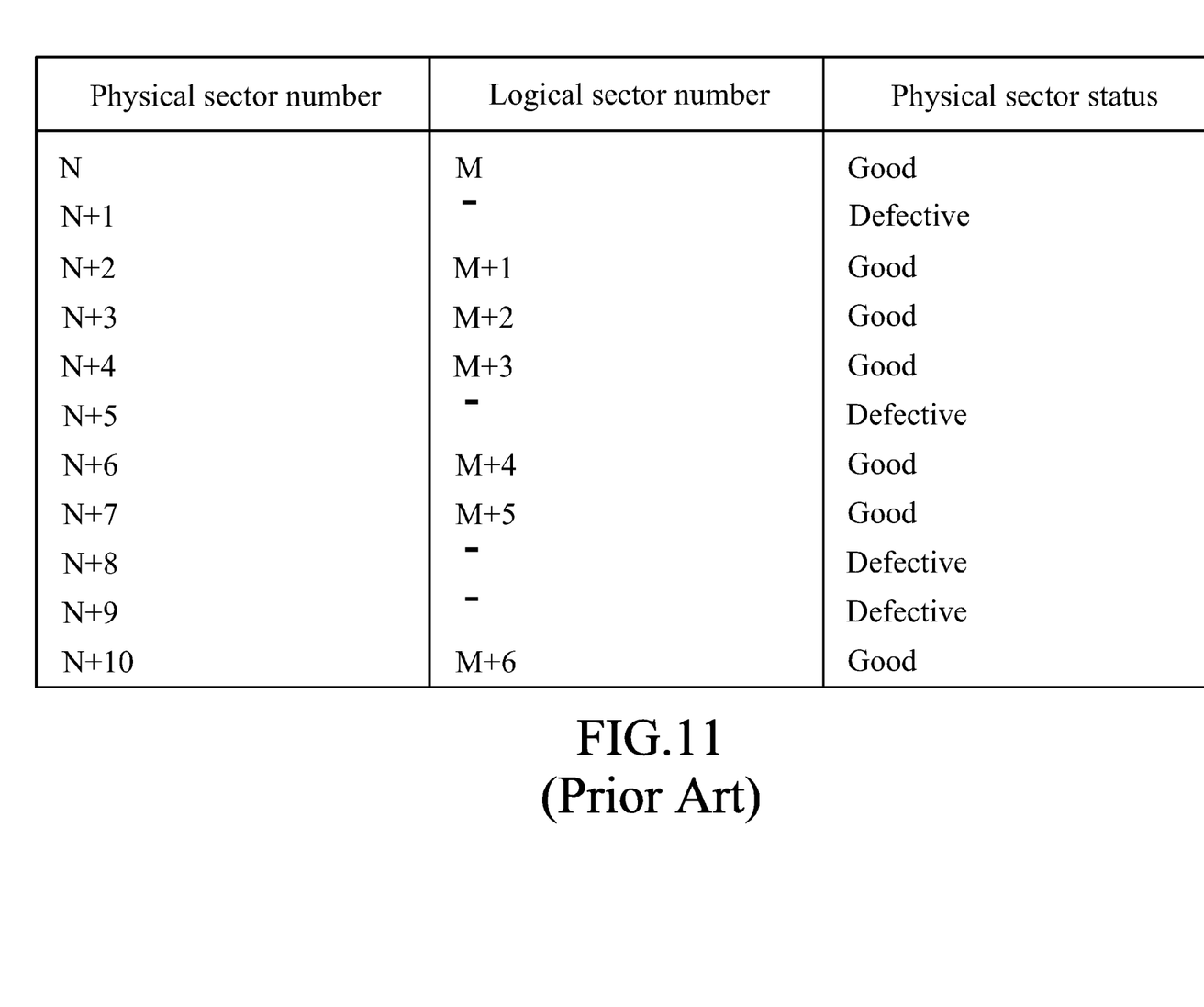
FIG. 11 is a data chart describing a relationship between a physical sector number (PSN) and a logical sector number (LSN) in a conventional optical media under a slipping replacement algorithm.

FIG. 11 shows a relationship between the physical sector number (PSN) and the logical sector number (LSN) under a slipping replacement algorithm, wherein for example, a physical sector with a physical sector number "N+1" is defective in status, a logical sector number "M+1" would be assigned to the next physical sector "N+2".

An U.S. Pat. No. 6,778,480 discloses a slip defective-area management apparatus and method for efficiently processing defective sectors read from an optical media. In an embodiment depicted in FIG. 5 of the U.S. Pat. No. 6,778,480, a DVD player 100 with utilization of slip defective-area management apparatus includes an optical pickup unit (OPU) 130, Read Channel 132, Physical Sector ID Module 134, Comparator 136, PDL Search Module 138, Synchronization Strategy Module 140 and Buffer Interface 142. The Physical Sector ID Module 134 analyzes the digital signals from Read Channel 132 to identify physical sector IDs associated with each sector read from a DVD. The Physical Sector ID Module 134 couples physical sector IDs (PIDs) from the PDL (typically, a copy of the PDL residing in a data buffer memory 120) to the comparator 136. During the data reading process, if a physical sector number (PSN) or identifier of any one of physical sectors/blocks to be read is not recognized as a defective sector/block pre-registered within the primary defect list (PDL), an user data on the sector/block would be read and then written into a data buffer memory 120 of the DVD player 100. Otherwise, the reading of the DVD player 100 would pause on the physical sector/block recognized defective so that the user data of the defective physical sector/block would not be written into the data buffer memory 120. Substantially, the reading of the DVD player 100 will bypass the defective sector/block to go on for a next sector/block neighboring to the defective sector. However, those steps of the convention method to be implemented for firstly determining whether to store which one sector/block or not in the data buffer memory 120 are over complicated with needs of interruption of data buffering. This may result in a long-time and overloading operation for the DVD player.

SUMMARY OF INVENTION

To resolve the aforementioned problems, it is, therefore, a primary objective of the present invention to provide a method for performing a defective-area management in an optical media, which is capable of simplifying the complicated steps of which the prior art uses, including primarily determining whether to store which one sector/block or not in the data buffer memory, by way of absence of interruption of data buffering, and therefore raising an operating performance.

To accomplish the above-mentioned objective, according to a first preferred embodiment of the present invention, a method for performing a defective-area management is introduced hereinafter, by utilization of a hardware apparatus. The method comprises the following steps of:

reading at least one user data from respective sector/block on the optical media, and getting a physical identifier (PID) corresponding to the read sector/block;

comparing the physical identifier (PID) of each read sector/block with the primary defect list (PDL);

determining whether the physical identifier of each read sector/block is included within the PDL to detect whether the read sector/block is defective or not;

if the physical identifier of the read sector/block is included within the primary defect list (PDL), generating a high-level PDL defect-recognized signal for asserting that the read sector/block is defective;

keeping buffering the read user data of each sector/block to a buffer memory, regardless of whether the read sector/block is defective;

according to the high-level PDL defect-recognized signal, replacing the buffered user data of the defective sector/block by a subsequent-read user data in the buffer memory;

oppositely if the physical identifier of the read sector/block is not included within the primary defect list (PDL), generating a low-level of the PDL defect-recognized signal to assert that the read sector/block should be indefective; and preserving the user data buffered within the buffer memory.

Beside according to a second preferred embodiment of the present invention, an alternative method for performing a defective-area management is introduced hereinafter, by utilization of a hardware apparatus. The alternative method comprises the following steps of:

reading at least one user data from respective sector/block on the optical media, and getting a physical identifier (PID) corresponding to the read sector/block;

comparing the physical identifier (PID) of each read sector/block with the primary defect list (PDL);

determining whether the physical identifier of each read sector/block is included within the PDL to detect whether the read sector/block is defective or not;

if the physical identifier of the read sector/block is included within the primary defect list (PDL), generating a high-level PDL defect-recognized signal for asserting that the read sector/block is defective;

according to the high-level PDL defect-recognized signal, buffering the read user data of the defective sector/block to a temporary memory;

oppositely if the physical identifier of the read sector/block is not included within the primary defect list (PDL), generating a low-level of the PDL defect-recognized signal to assert that the read sector/block should be indefective; and keeping buffering the read user data of the indefective sector/block to a main memory.

These and other objectives of the present invention will no doubt become obvious to those of ordinary skill in the art after reading the following detailed description of the preferred embodiment that is illustrated in the various figures and drawings.

DETAILED DESCRIPTION

Figure 12A:
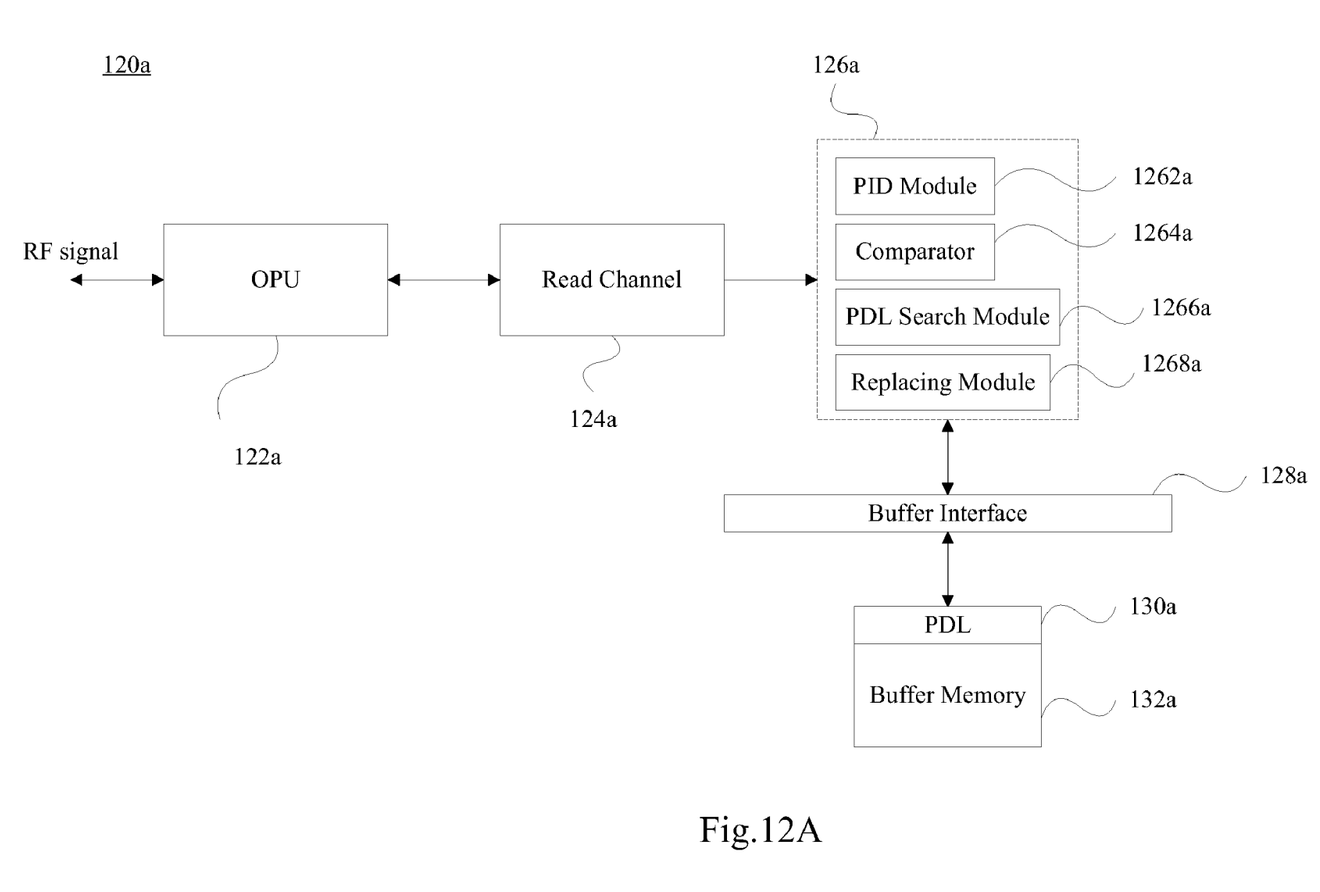
FIG. 12A illustrates a schematic architecture diagram of a hardware apparatus which is implemented for the method of performing the defective-area management according to the first preferred embodiment of the present invention.

According to a first preferred embodiment of the present invention, a method for performing a defective-area management adaptive to a slipping replacement algorithm in an optical media is introduced hereinafter, by utilization of a hardware apparatus to actively slip any defective sector/block, which has been pre-registered within a primary defect list (PDL) on the optical media. As shown in FIG. 12A, the hardware apparatus can be implemented as a reading apparatus 120a (e.g. a DVD player), which includes an optical pickup unit (OPU) 122a for reading out an analog RF signal from corresponding sector/block on the optical media, a read channel 124a for converting the analog RF signal into digitalized signal to proceed, a defect monitor unit 126a for recognizing and processing each defective sector/block occurring on the optical media, a buffer memory 132a for accommodating the user data read from the corresponding indefective sector/block, and a buffer interface 128a for accessing the user data stored within the buffer memory 132a or a physical identifier (PID) of each defective sector/block pre-registered within a primary defect list (PDL) 130a. Furthermore, the defect monitor unit 126a can be constructed of a PID module 1262a for identifying a physical identifier (PID) corresponding to the sector/block from the digitalized signal, a comparator 1264a for comparing the identified PID with the PID pre-registered within the PDL 130a to determine whether to generate a PDL defect-recognized signal with a high level or a low level, a PDL search module 1266a with use of an optimal search algorithm for searching the relative PID in the PDL 130a, and a replacing module 1268a according to which level of the PDL defect-recognized signal to determine whether to give up or preserve the corresponding user data buffered in the buffer memory 132a via the buffer interface 128a.

Figure 3A:
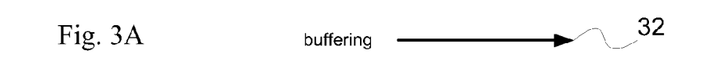
FIGS. 3A, 3B and 3C illustrate a schematic diagram of an relationship among a buffering procedure, a corresponding buffer memory for storing each read user data of each sector/block, and a PDL detect signal with a high level, by a method for performing a defective-area management in an optical media according to a first preferred embodiment of the present invention.
Figures 3B, 3C:
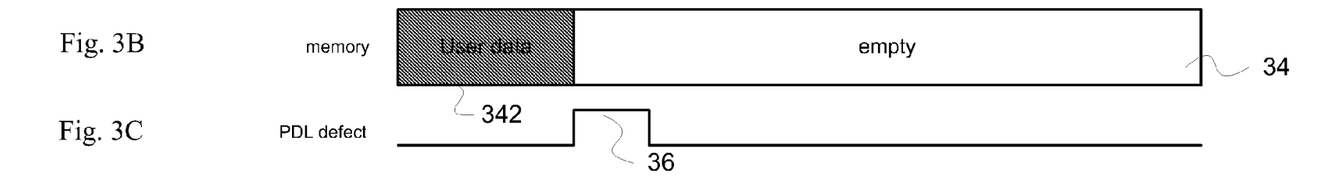
Figures 4A, 4B:
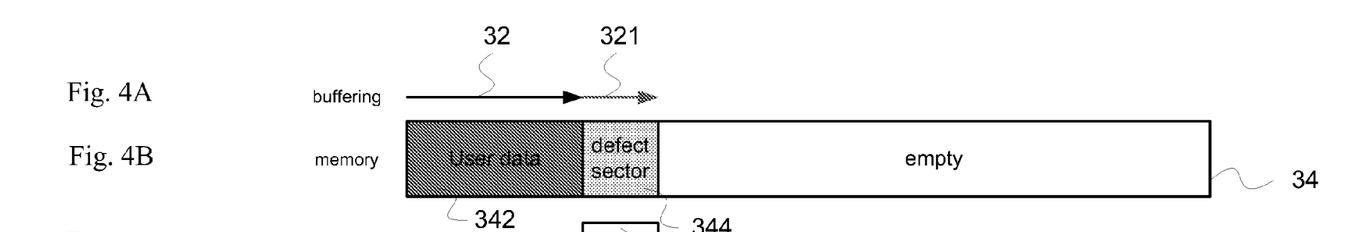
FIGS. 4A, 4B and 4C illustrate a schematic diagram of an relationship among each buffering procedure, the buffer memory that stores therein the read user data of a defective sector/block, and the PDL detect signal with high level, by the method for performing the defective-area management according to the first preferred embodiment of the present invention.
Figure 4C:
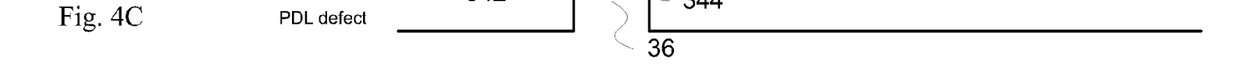
Figure 5A:
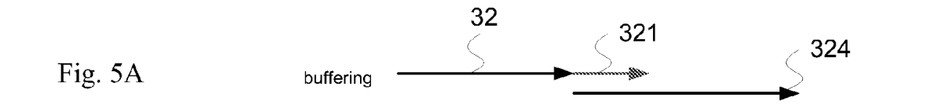
FIGS. 5A, 5B and 5C illustrate a schematic diagram of an relationship among each buffering procedure, the buffer memory that the read user data of a defective sector/block is replaced with another user data of a next indefective sector/block, and the PDL detect signal with a low level, by the method for performing the defective-area management according to the first preferred embodiment of the present invention.
Figure 5B:
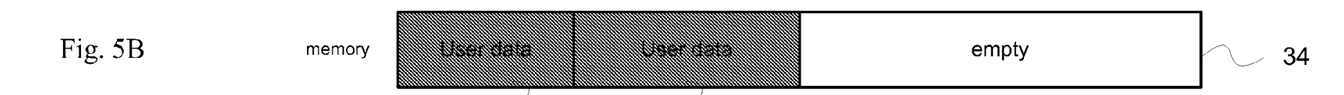
Figure 5C:
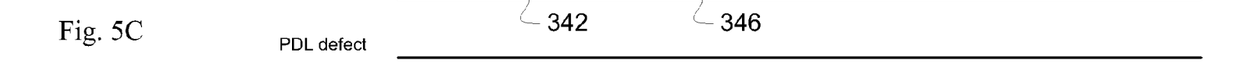
Figure 9:
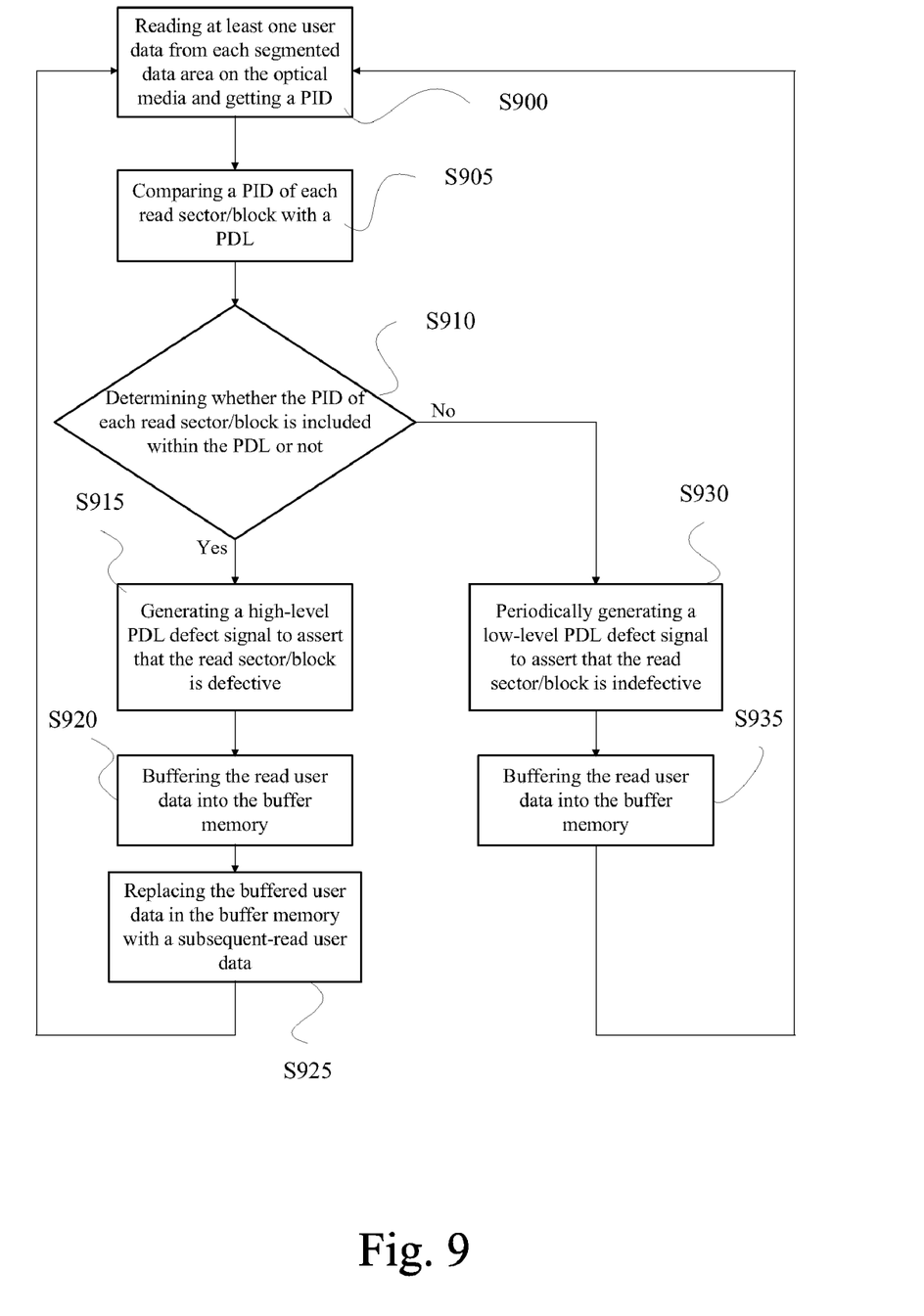
FIG. 9 illustrates a flow chart of a method for performing a defective-area management adaptive to a slipping replacement algorithm in an optical media according to the first preferred embodiment of the present invention.

The method for performing a defective-area management in an optical media, as shown in FIG. 9, with utilization of the above-mentioned hardware architecture, comprises the following steps of:

Step S900, by the OPU and read channel of the reading apparatus, reading at least one user data from corresponding segmented data area allocated on the optical media, and then by the PID module, reading a physical identifier (PID) representative of a physical location of the segmented data area. Each segmented data area can be either a physical sector for application of a DVD-RAM type optical media, or an error correction code (ECC) block for alterative application of a HDDVD type optical media. The physical identifier is as a physical sector number (PSN) referring to the physical sector/block on the optical media;

Step S905, comparing a physical identifier (PID) of each read sector/block with physical identifiers pre-registered within the primary defect list (PDL) by the comparator of the defect monitor unit, via the search of the PDL search module in the PDL;

Step S910, determining whether the physical identifier of each read sector/block is included within the PDL to detect whether the read sector/block is defective or not;

Step S915, if the physical identifier of the current read sector/block is included within the primary defect list (PDL), generating a PDL defect-recognized signal with a high level 36 (as shown in FIG. 3C) from the comparator of the defect monitor unit to the replacing module for asserting that the read sector/block is defective, during a procedure 32 of buffering the previous read user data 342 from the optical media to a buffer memory 34 by the replacing module (as shown in FIGS. 3A and 3B);

Step S920, the replacing module keeping buffering the read user data 344 of the defective sector/block to the buffer memory 34 via the buffer interface during a buffering procedure 321 (as shown in FIGS. 4A and 4B), even when the PDL defect-recognized signal with high level 36 (as shown FIG. 4C) is asserted;

Step S925, according to the PDL defect-recognized signal with high level from the comparator, the replacing module automatically giving up this buffered user data of the defective sector/block within the buffer memory 34 at the end of buffering the user data 342, and then keeping buffering a subsequent-read user data 346 of a next sector/block (returning to the step S900) to the previous memory location of the buffer memory 34 (as shown in FIGS. 5A and 5B) via the buffer interface, by a way of keeping a value unchanged, which is corresponding to a buffer pointer to point to the buffer memory 34. It means that the buffered user data of the defective sector/block will be replaced by the subsequent-read user data 346 in the buffer memory 34 during a buffering procedure 324 (as shown is FIGS. 5A and 5B) wherein the subsequent-read user data 346 induces none of/a lower level of the PDL defect-recognized signal and therefore the next sector/block corresponding to the subsequent-read user data 346 should be indefective;

Step S930, oppositely if the physical identifier of the read sector/block is not included within the primary defect list (PDL), periodically keeping generating a low-level PDL defect-recognized signal (as shown in FIG. 5C) by the comparator of the defect monitor unit to the replacing module for asserting that the read sector/block should be indefective; and Step S935, according to the low-level PDL defect-recognized signal, the replacing module keeping buffering the read user data of the sector/block to the buffer memory and preserving the buffered the user data, by way of counting up an value corresponding to the buffer pointer to be written in the buffer memory; and then returning to the step S900 for reading of the next sector/blocks on the optical media.

Figure 12B:
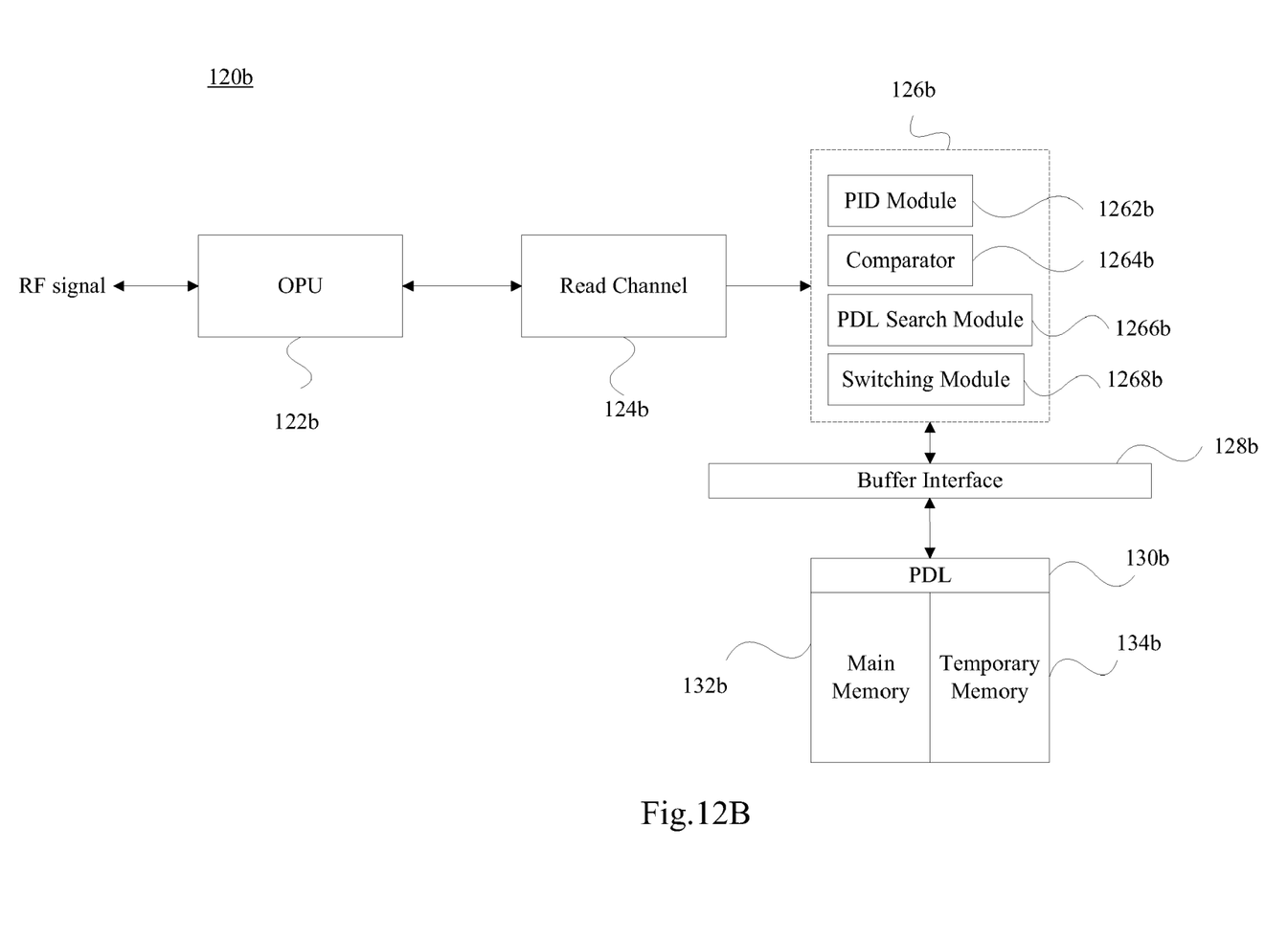
FIG. 12B illustrates a schematic architecture diagram of an alternative hardware apparatus which is implemented for the method of performing the defective-area management according to the second preferred embodiment of the present invention.

According to a second preferred embodiment of the present invention, an alternative method for performing a defective-area management adaptive to a slipping replacement algorithm in an optical media is introduced hereinafter by utilization of a hardware apparatus to actively slip any defective sector/block, which has been pre-registered within a primary defect list (PDL) on the optical media. As shown in FIG. 12B, the hardware apparatus can be implemented as a reading apparatus 120b (e.g. a DVD player), which includes an optical pickup unit (OPU) 122b for reading out an analog RF signal from corresponding sector/block on the optical media, a read channel 124b for converting the analog RF signal into digitalized signal to proceed, a defect monitor unit 126b for recognizing and processing each defective sector/block occurring on the optical media, a main memory 132b for accommodating the user data of each read indefective sector/block, a temporary memory 134b for accommodating the user data of each read defective sector/block, and a buffer interface 128b for accessing the user data stored within the main memory 132b or the temporary memory 134b, or a physical identifier (PID) of each defective sector/block pre-registered within a primary defect list (PDL) 130b. Furthermore, the defect monitor unit 126b can be constructed of a PID module 1262b for identifying a physical identifier (PID) corresponding to the sector/block from the digitalized signal, a comparator 1264b for comparing the identified PID with the PID pre-registered within the PDL 130b to determine whether to generate a PDL defect-recognized signal with a high level or a low level, a PDL search module 1266b with use of an optimal search algorithm for searching the relative PID in the PDL 130b, and a switching module 1268b according to which level of the PDL defect-recognized signal to determine whether to directly buffer the corresponding user data buffered into either the main memory 132b or the temporary memory 134b, via the buffer interface 128b.

Figures 6A, 6B:
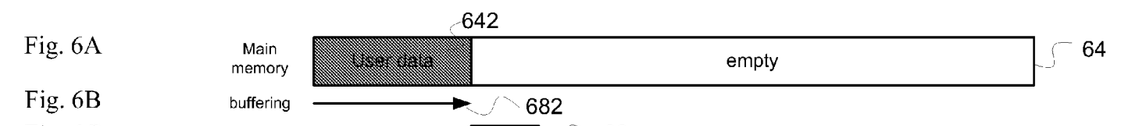
FIGS. 6A, 6B, 6C and 6D illustrate a schematic diagram of an relationship among each buffering procedure, a main memory that storing a read user data of an indefective sector/block, a temporary memory which is empty, and a PDL detect signal with a high level, by a method for performing a defective-area management according to a second preferred embodiment of the present invention.
Figures 6C, 6D:
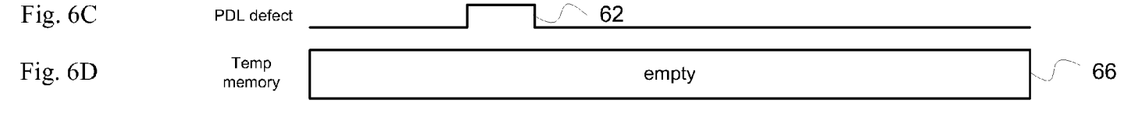
Figures 7A, 7B:
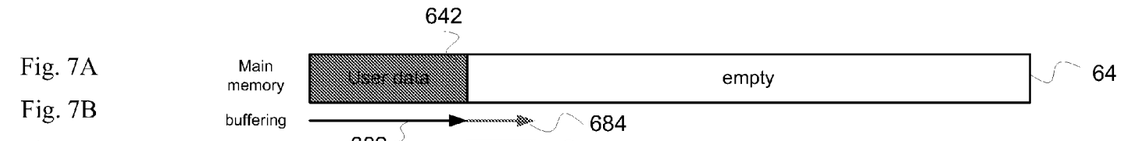
FIGS. 7A, 7B, 7C and 7D illustrate a schematic diagram of an relationship among each buffering procedure, the main memory that stores the read user data of the indefective sector/block, the temporary memory that successively stores therein the read user data of the defective sector/blocks, and the PDL detect signal with a high level, by the method for performing the defective-area management according to the second preferred embodiment of the present invention.
Figures 7C, 7D:
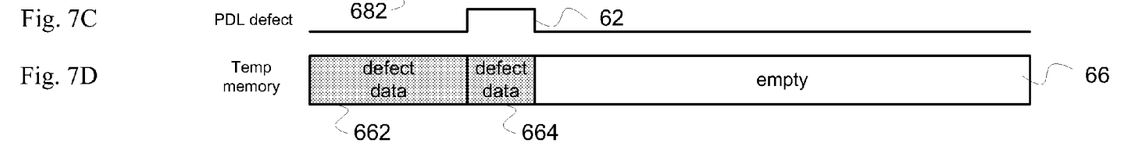
Figure 8A:
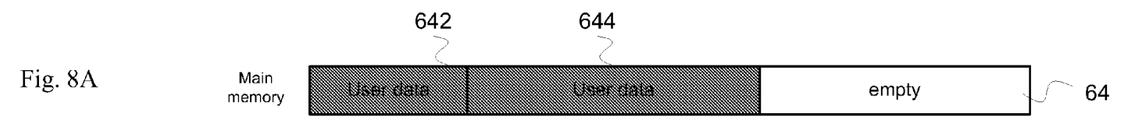
FIGS. 8A, 8B, 8C and 8D illustrate a schematic diagram of an relationship among each buffering procedure, the main memory that successively stores therein the read user data of the indefective sector/blocks, the temporary memory that successively stores therein the read user data of the defective sector/blocks, and the PDL detect signal with a low level, by the method for performing the defective-area management according to the second preferred embodiment of the present invention.
Figures 8B, 8C, 8D:
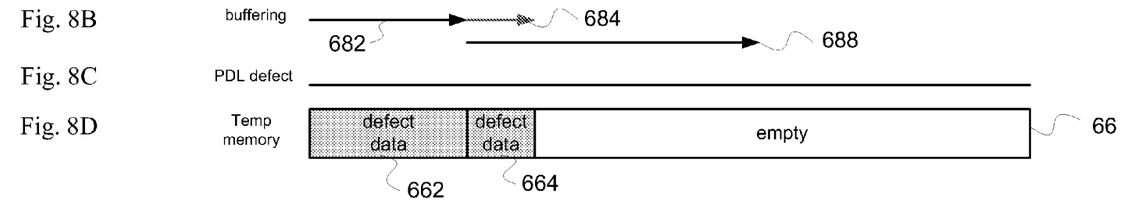
Figure 10:
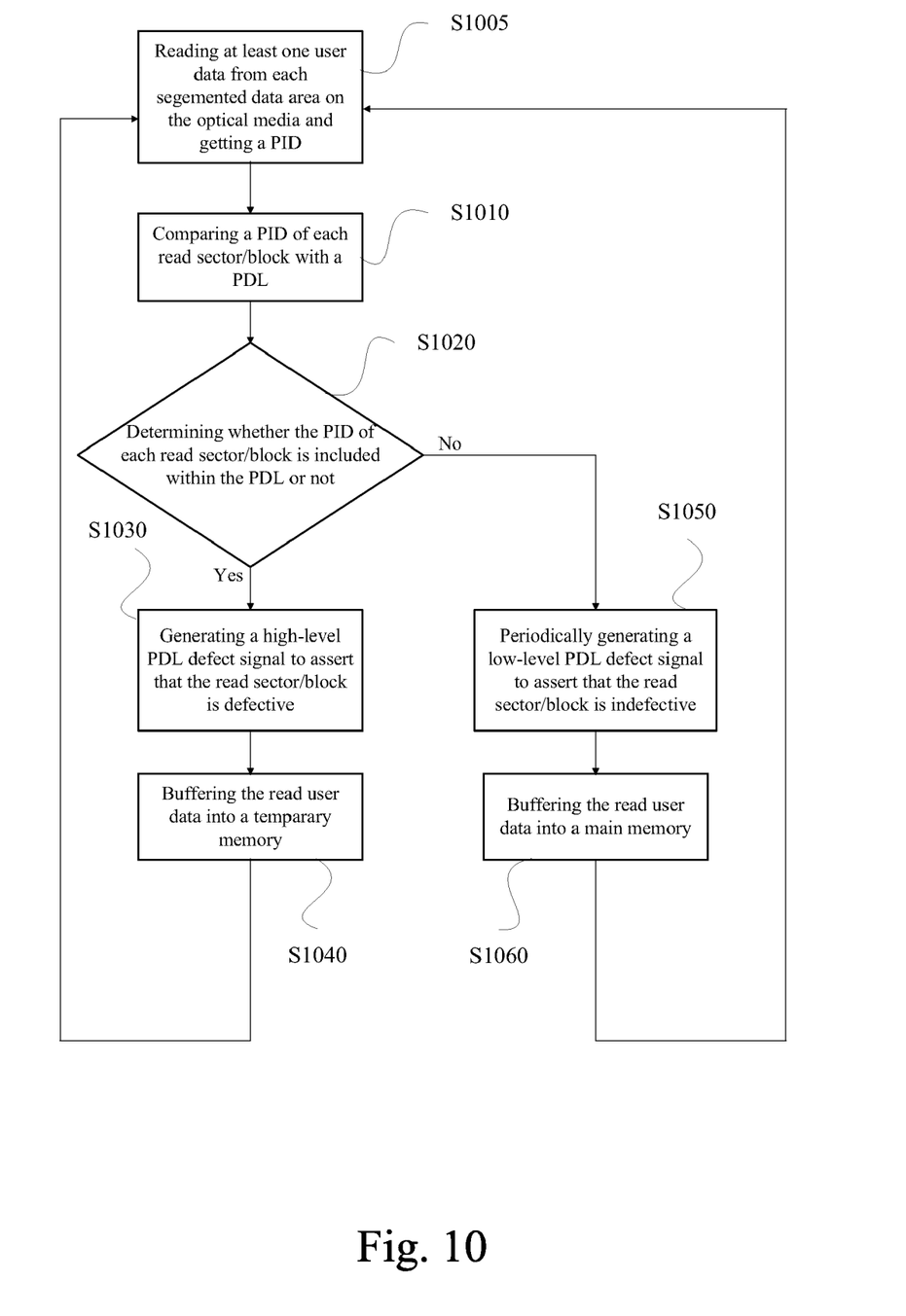
FIG. 10 illustrates a flow chart of an alternative method for performing a defective-area management adaptive to a slipping replacement algorithm in an optical media according to the second preferred embodiment of the present invention.

The alternative method for performing a defective-area management in an optical media, as shown in FIG. 10, with utilization of the above-mentioned hardware architecture, comprises the following steps of:

Step S1005, by the OPU and read channel of the reading apparatus, reading at least one user data from corresponding segmented data area allocated on the optical media, and then by the PID module, reading a physical identifier (PID) representative of a physical location of the segmented data area. Each segmented data area can be either a physical sector for application of a DVD-RAM type optical media, or an error correction code (ECC) block for alterative application of a HDDVD type optical media. The physical identifier is as a physical sector number (PSN) referring to the physical sector/block on the optical media;

Step S1010, comparing a physical identifier (PID) of each read sector/block with physical identifiers pre-registered within the primary defect list (PDL) by the comparator of the defect monitor unit, via a search of the PDL search module in the PDL;

Step S1020, determining whether the physical identifier of each read sector/block is included within the PDL to detect whether the read sector/block is defective or not;

Step S1030, if the physical identifier of the current read sector/block is included within the primary defect list (PDL), generating a PDL defect-recognized signal with a high level 62 (as shown in FIG. 6C) from the comparator of the defect monitor unit to the switching module for asserting that the read sector/block is defective, after a procedure 682 of buffering the previous read user data 642 from the optical media to a main memory 64 (as shown in FIGS. 6A and 6B) by the switch module at the same time when FIG. 6D shows that a temporary memory 66 is kept empty without occupation of any data;

Step S1040, according to the PDL defect-recognized signal with high level 62 (as shown in FIG. 7C), the switching module keeping buffering the read user data 664 of the defective sector/block to the temporary memory 66 during a buffering procedure 684 (as shown in FIG. 7B), with serially neighboring to the user data 642 of previous defective sector/block (as shown in FIG. 7D) at the same time when FIG. 7A shows that the capability of the main memory 64 is kept unchanged; and then returning to the step S1005 for reading of the next sector/block;

Step S1050, oppositely if the physical identifier of the read sector/block is not included within the primary defect list (PDL), periodically generating none/low level of the PDL defect-recognized signal (as shown in FIG. 8C) by the comparator of the defect monitor unit to the switching module for asserting that the read sector/block should be indefective;

Step S1060, according to the low-level PDL defect-recognized signal, the switching module keeping buffering the read user data 644 of the indefective sector/block to the main memory 64 during a buffering procedure 688 (as shown in FIGS. 8A and 8B) at the same time when FIG. 8D shows that the capability of the temporary memory 66 is kept unchanged; and then returning to the step S1005 for reading of the next sector/block.

In inclusion, the present invention provides a method for performing a defective-area management in an optical media, which is capable of simplifying the complicated steps of which the prior art uses, including primarily determining whether to store which one sector/block or not in the data buffer memory, by way of keeping buffering the read user data of the sector/block to the memory, with absence of interruption of data buffering, regardless of the read sector/block is defective, or keeping buffering the user data to one of two different memories based on whether the sector/block is defective, thereby raising an operating performance.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for performing a defective-area management in an optical media with segmented data areas, comprising the following steps of:
   reading at least one user data from one of the segmented data areas of the optical media, regardless of whether the read segmented data area is defective; and
   buffering continuatively the read user data into a memory unit, regardless of whether the read segmented data area is defective.

2. The method as claimed in claim 1, wherein the segmented data area is either a physical sector or an error correction code block.

3. The method as claimed in claim 1, further comprises a step of reading a physical identifier representative of a physical location of the segmented data area upon a condition of reading the at least one user data.

4. The method as claimed in claim 3, wherein the physical identifier is a physical sector number.

5. The method as claimed in claim 3, wherein the physical identifier of which the segmented data area is defective on the optical media is pre-recorded in a defect list established in the optical media.

6. The method as claimed in claim 5, further comprises a step of:
   comparing the physical identifier of the read segmented data area with respective physical identifier recorded within the defect list to determine whether the read segmented data area is defective or not.

7. The method as claimed in claim 6, further comprises a step of:
if the physical identifier of the segmented data area is out of the recordation of the defect list, preserving the buffered user data within the memory unit.

8. The method as claimed in claim 7, further comprises a step of:
counting up a value which is corresponding to a buffer pointer to be written in the memory for preserving the buffered user data within the memory unit.

9. The method as claimed in claim 6, further comprising a step of:
if the physical identifier of the read segmented data area is included within the physical identifiers pre-recorded within the defect list, generating a high-level defect-recognized signal to assert that the read segmented data area is defective.

10. The method as claimed in claim 9, further comprises a step of:
according to the high-level defect-recognized signal, asserting a condition that the segmented data area is defective, and then replacing the buffered user data of the segmented data area with a subsequent read user data in the memory unit.

11. The method as claimed in claim 10, further comprises a step of:
keeping a value unchanged, wherein the value is corresponding to a buffer pointer to point to the memory unit.

12. The method as claimed in claim 9, wherein the memory unit includes a main memory and a temporary memory.

13. The method as claimed in claim 12, further comprising a step of:
according to the high-level defect-recognized signal, asserting a condition that the segment data area is defective, and then buffering continuatively the corresponding user data to the temporary memory.

14. The method as claimed in claim 13, further comprising a step of:
if the physical identifier of the segmented data area is out of the recordation of the defect list, buffering continuatively the corresponding data into the main memory.

15. A method for performing a defective-area management in an optical media with segmented data areas, comprising the following steps of:
reading at least one user data from one of the segmented data areas of the optical media;
determining whether each read segmented data area is defective;
storing continuatively the read data into a buffer memory, regardless of whether the read segmented data area is defective or not;
if the read segmented data area is indefective, preserving the stored user data within the buffer memory; and
if the read segmented data area is defective, replacing the stored user data with a subsequent read user data in the buffer memory.

16. The method as claimed in claim 15, further comprising a step of reading a physical identifier representative of a physical location of the segmented data area upon a condition of reading the at least one user data.

17. The method as claimed in claim 16, further comprising a step of:
comparing the physical identifier of the segmented data area with the physical identifiers of defective segmented data area which are pre-recorded in a defect list on the optical media.

18. The method as claimed in claim 17, further comprising a step of:
if the physical identifier of the segmented data area is included within the defect list, generating a high-level defect-recognized signal to determine whether the read segmented data area is defective.

19. The method as claimed in claim 18, further comprising a step of:
if the high-level defect-recognized signal is generated, replacing the stored user data with a subsequent read user data in the buffer memory.

20. The method as claimed in claim 19, further comprising a step of:
keeping a value unchanged, wherein the value is corresponding to a buffer pointer to point to the buffer memory.

21. The method as claimed in claim 17, further comprising a step of:
if the physical identifier of the segmented data area is out of recordation of the defect list, generating a low-level of the defect-recognized signal to assert that the read segmented data area is indefective.

22. The method as claimed in claim 21, further comprising a step of:
according to the low-level defect-recognized signal, preserving the stored user data within the buffer memory.

23. The method as claimed in claim 22, further comprising a step of:
counting up a value corresponding to a buffer pointer to be written in the buffer memory for preserving the stored user data in the buffer memory.

24. A method for performing a defective-area management in an optical media with segmented data areas, comprising the following steps of:
reading at least one user data from one of the segmented data area of the optical media;
determining whether each read segmented data area is defective;
buffering continuatively the read user data to one of both a main memory and a temporary memory, regardless of whether the corresponding data area is defective or not, wherein
if the read segmented data area is indefective, buffering the corresponding user data to the main memory; and
if the read segmented data area is defective, buffering the corresponding user data to the temporary memory.

* * * * *